United States Patent [19]

Katz

[11] Patent Number: 4,619,290

[45] Date of Patent: Oct. 28, 1986

[54] TORQUELESS FLUID CONNECTOR

[75] Inventor: Ellis Katz, Encino, Calif.

[73] Assignee: Rockwell International Corporation, El Segundo, Calif.

[21] Appl. No.: 689,409

[22] Filed: Jan. 7, 1985

[51] Int. Cl.$^4$ .............................................. F16L 55/00
[52] U.S. Cl. ........................................ 138/39; 277/79; 285/14; 285/262
[58] Field of Search ...................... 138/39; 277/29, 30, 277/74; 285/14, 262

[56] References Cited

U.S. PATENT DOCUMENTS 950,665  3/1910  Forth .................................. 285/262

FOREIGN PATENT DOCUMENTS 497482   4/1930  Fed. Rep. of Germany ........ 285/14
2212746  9/1972  Fed. Rep. of Germany ........ 138/39

Primary Examiner—Stephen Marcus
Assistant Examiner—Mark Thronson
Attorney, Agent, or Firm—H. Fredrick Hamann; Harry B. Field; David C. Faulkner

[57] ABSTRACT

A connector 10 for a fluid-flow line comprising a pair of truncated spheres, the inner 14 nesting within the outer 12, with the truncated ends facing in opposite directions. The non-truncated ends of the spheres are each connected to a different circular disc with a grid structure, called an end member 22, 22'. An adjustable tension wire 24 is stretched between the end members 22, 22' and holds the spheres 12, 14 together. A fluid-bearing seal 16 is affixed to the outer surface of the inner sphere 14 and is in contact with the inner surface of the outer sphere 12. A second seal 18 is attached between the spheres 12, 14 but spaced from the fluid-bearing seal 16 to form a seepage space 30 therebetween. The fluid-bearing seal 16 is formed with internal tubes 32 which permit a small leakage flow from the main flow into the seepage space 30 between the upper surface 34 of the seal 16 and the inner surface of the outer sphere 12 so as to reduce friction between these surfaces. The leakage fluid in the seepage space 30 is drained off continually by an outlet seepage tube 20.

9 Claims, 3 Drawing Figures

TORQUELESS FLUID CONNECTOR

BACKGROUND OF THE INVENTION

1. Field of the Invention

This invention relates to a torqueless connector and especially to a torqueless connector for coupling coolant liquid to the mirror of a high-energy laser.

2. Description of the Prior Art

The beam-directing mirrors of a high-energy laser are subjected to so much heat that they become thermally distorted if precautions are not taken. The mirrors are usually cooled by the flow of a coolant fluid through passageways in the mirror. These passageways are normally connected by flex lines or bellows to a coolant supply system which is located at a distance from the mirror. However, conventional flex lines or bellows can create excessive torque loads on the cooled laser mirrors. This is particularly true of mirrors which are isolated at low frequencies (<10 Hz), such as magnetically-suspended mirrors.

OBJECTS OF THE INVENTION

An object of this invention is to eliminate the torque which is present in a connector in a fluid-flow line.

Other objects, advantages and novel features of the present invention will become apparent from the following detailed description of the invention when considered in conjunction with the accompanying drawing.

SUMMARY OF THE INVENTION

The invention comprises a connector constructed from two truncated, spherical, ball members, the inner one nested within the outer one, the truncated ends facing in different directions. The other ends of the spheres are each connected to a circular, disc-like member which forms a grid to straighten the flow. A tension wire is located between and affixed adjustably to the centers of the end members to compensate the fluid-pressure loads which tend to separate the ball members. A circular, compressible seal is located in a groove which encircles the outer surface of the inner ball member so that the outer surface of the seal and the inner surface of the outer ball member are adjacent each other. Grooves are formed in the inner ball member connecting with tubes in the seal to permit seepage of the flow between the outer fluid surface of the seal and the inner surface of the outer ball member. The seepage goes into a seepage space between the ball members downstream of the fluid-bearing seal, the seepage space being closed off by a membrane seal between the ball members at the truncated end of the upper ball member. Seepage fluid in the seepage space is drained off by a seepage tube running through the outer ball member.

BRIEF DESCRIPTION OF THE FIGURES

The same elements or parts throughout the figures of the drawing are designated by the same reference characters, while equivalent elements bear a prime designation.

DETAILED DESCRIPTION OF THE INVENTION

Figure 1:
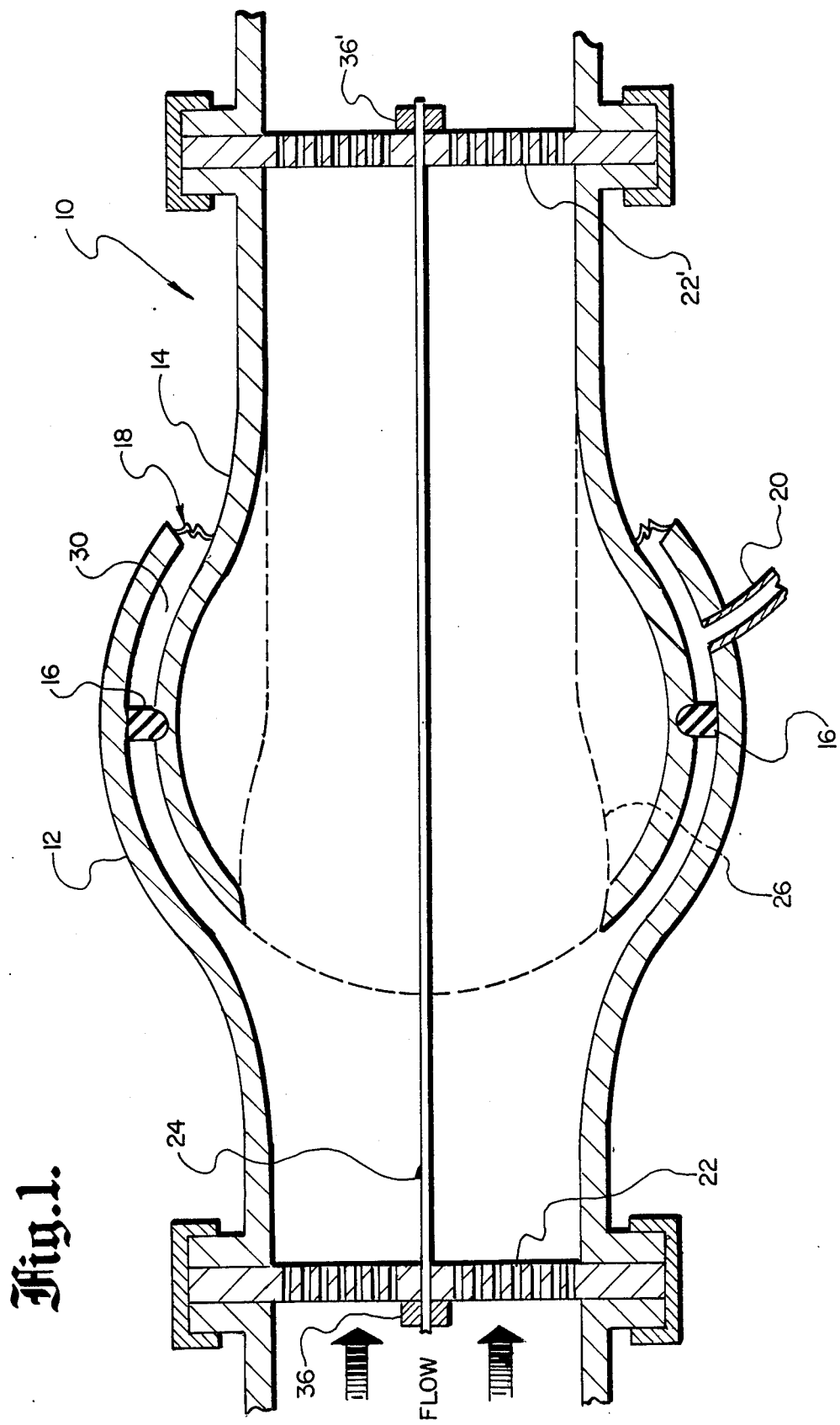
FIG. 1 is a radial cross-section of an embodiment of the invention.

An axial cross-section of the invention is shown in schematic form in FIG. 1. The torqueless connector 10 comprises an outer ball member 12 similar in shape to a truncated sphere with a tube attached to its non-truncated end, and an inner ball member 14 shaped like and nesting within the outer ball member 12. (However, the device will operate with the stream flowing in the opposite direction.)

Figure 2:
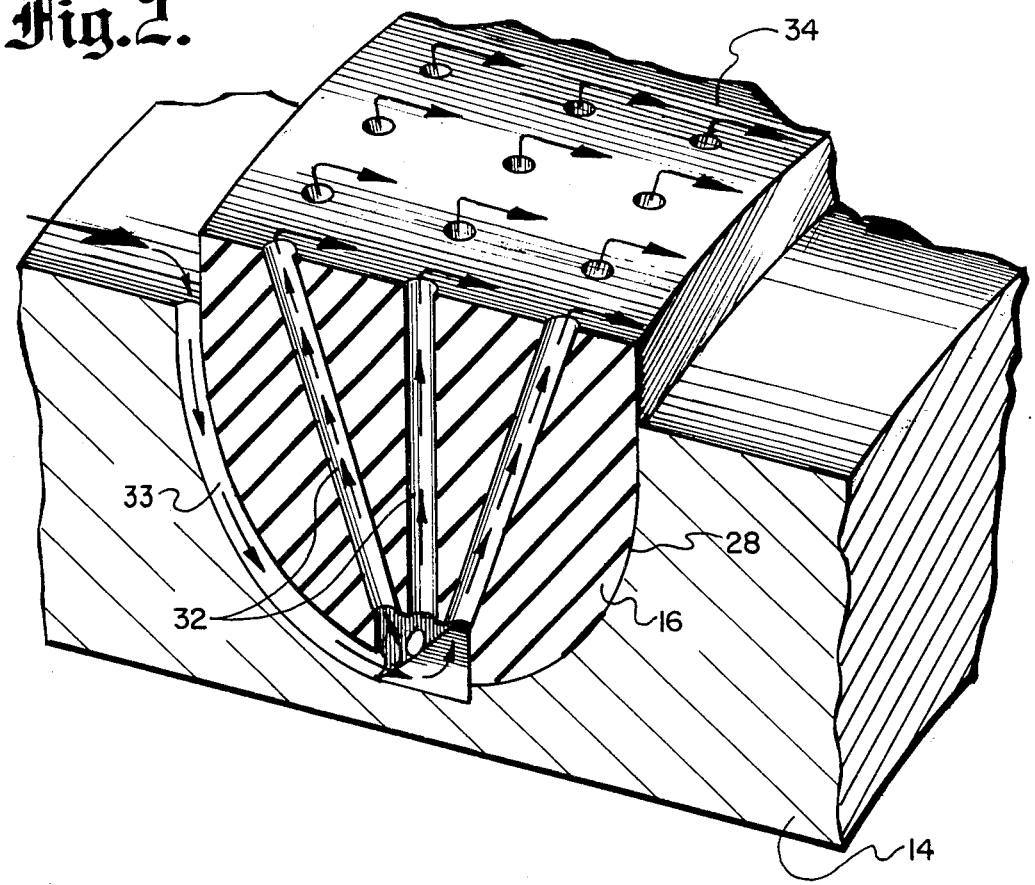
FIG. 2 is a partial cross-section through the fluid-bearing seal illustrating its construction.

A fluid-bearing seal 16 is affixed to the outer surface of the inner ball member 14 and lies adjacent to the inner surface of the outer ball member 12. The seal 16 is set within a circumferential groove 28 (see FIG. 2). A series of inlet grooves 33 (see FIG. 2) impressed in the circumferential groove 28 connect with medial grooves, or seepage tubes, 32 and allow a seepage flow across the outer surface 34 of the seal 16 whereby the outer seal surface 34 is actually separated from the inner surface of the outer ball member 12 by leakage flow. The seal material, which must have a certain amount of compliance, compresses under fluid pressure to provide clearance for controlled seepage and low friction between the ball members. The fluid-bearing seal 16 may be made of a plastic polymer, such as TEFLON (trademark for tetrafluoroethylene fluorocarbon resins). It should be a moldable material so that the seepage tubes 32 may easily be formed. The leakage is necessary to form a fluid flow between the seal and the outer ball member in order to achieve a very low value of friction between the seal and the outer ball member, i.e., the friction is due only to fluid viscosity of the leakage flow. Note that the seal 16 may actually be inverted, i.e., the seal 16 may be in a groove in the inner surface of the outer ball member 12 and the outer seal surface 34 of the seal 16 may be adjacent to the outer surface of the inner ball member 14.

Seepage fluid collects in a seepage space 30 between the fluid-bearing seal 16 and a low-pressure membrane seal 18 which is flexible and inert to the fluids being used (e.g., water for cooling laser mirrors). The material of the membrane seal 18 may, for example, be MYLAR (trademark for films of polyethylene terephthalate). The seepage fluid is drained from the seepage space 30 by a tube 20 which can be connected to an adjustable-pressure valve if control of the pressure within the seepage space 30 is found to be necessary.

The tubular end of the outer ball member 12 is connected to a fluid-straightening, tension-wire-holding end member 22 in the shape of a circular grid. The tubular end of the inner ball member 14 is connected to a similar end member 22'. The grid structure of the end members 22, 22' serves to straighten the flow pattern of the fluid flow. The end members 22, 22' also, and more importantly, serve to anchor the ends of a tension wire 24. The fluid pressure force tending to separate the ball members 12 and 14 is opposed by the tension in the tension filament 24 which is anchored by bolts 36, 36' in the end members 22, 22'. One of the bolts 36, 36' should be adjustable so that the tension in the tension wire 24 may be adjusted. With the small deflections (<1 milliradian) for which the connector is designated, the tension wire is not a destabilizing factor.

Figure 3:
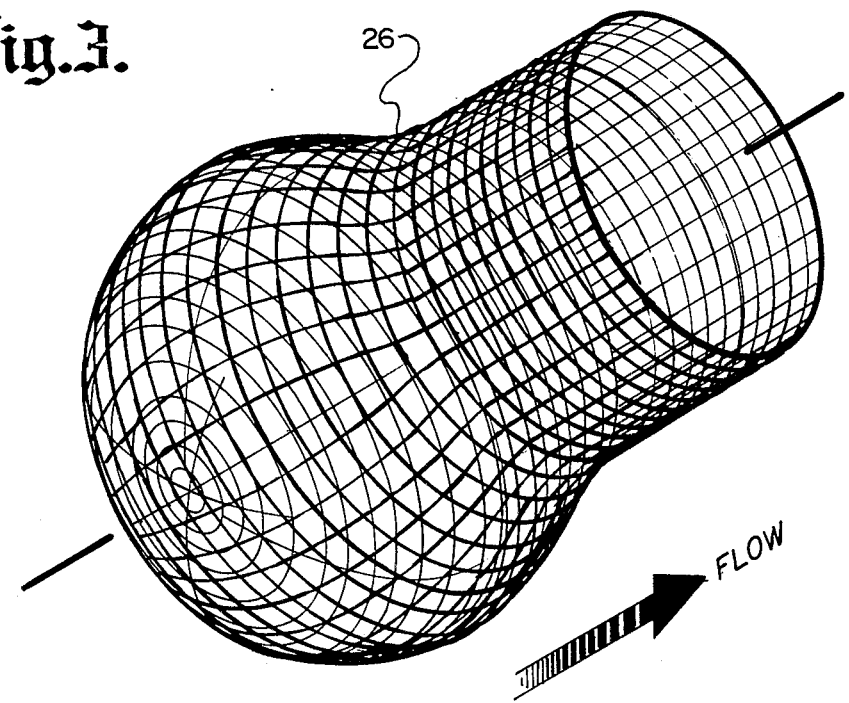
FIG. 3 is an isometric view of a low-turbulence screen which may be used with this invention.

A low-turbulence screen 26 may be located within the connector 10, if needed to break up vortex formation within the connector. FIG. 3 shows an isometric view of the screen 26 which is open at the downstream end where it can be connected to the tubular inner surface of the inner ball member 14.

The end members 22, 22' and the ball members 12, 14 may be constructed from Al, for example. The low-turbulence screen 26 may be constructed from carbon filament epoxied together at crossing points to form a stiff grid structure.

The only torque experienced by the connector 10 is that of fluid viscosity between the fluid-bearing seal 16 and the outer ball member 12. More than one connector 10 may be placed in series with each other to further reduce any remaining torque.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A connector for a fluid-flow line, designed to minimize the torque effects of fluid-flow on the connector, comprising;
   an outer ball member comprising a truncated sphere with a tubular shape at the non-truncated end;
   an inner ball member shaped like the outer ball member and nesting within it, the truncated end of the outer ball member facing towards the downstream side of the flow and the truncated end of the inner ball member facing upstream;
   a seal groove having an upstream wall included in an outer surface of said inner ball member and extending around the outer surface of said inner ball member;
   a pair of functioning end members comprising circular discs in the form of a grid structure, each end member being attached to the tubular open end of a different ball member;
   a tension wire adjustably attached to and located between said end members;
   a fluid-bearing seal located between said ball members to seal, with a limited amount of leakage, the space between said members being defined by the opposing outer surface of the inner ball member and the inner surface of the outer ball member;
   a second seal between the truncated end of the outer ball member and the outer surface of the inner ball member, the second seal being spaced from the fluid-bearing seal to form a seepage space in which leakage fluid from the fluid-bearing seal accumulates; and
   means for draining the leakage fluid from the seepage space.

2. A connector as in claim 1, wherein:
   the means for draining the leakage fluid is a tube extending through the outer ball member into the seepage space.

3. A connector as in claim 1, wherein:
   the fluid-bearing seal is set into said seal groove extending around the outer surface of the inner ball member.

4. A connector as in claim 3, further including:
   a plurality of spaced inlet grooves extending along the upstream wall of the seal groove;
   an outer seal surface; and
   internal radial tubes associated with the inlet grooves at one end thereof and extending to the outer surface of the seal.

5. A connector as in claim 1, further including:
   a low-turbulence screen lying within the connector.

6. A connector for a fluid-flow line, designed to minimize the torque effects of fluid flow on the connector, comprising:
   an outer ball member comprising a truncated sphere with a tubular shape at the non-truncated end;
   an inner ball member shaped like said outer ball member and nesting within it, the truncated end of the outer ball member facing towards the downstream side of the flow and the truncated end of the inner ball member facing upstream;
   a seal groove having an upstream wall included in an outer surface of said inner ball member and extending around the outer surface of said inner ball member;
   a pair of functioning end members comprising circular discs in the form of a grid structure, each end member being attached to the tubular open end of a different ball member;
   a tension wire adjustably attached to and located between said end members;
   a fluid-bearing seal including an outer surface and formed with internal radial tubes located within said seal groove and between said ball members to seal, with a limited amount of leakage, the space between said members;
   a plurality of inlet grooves extending along said upstream wall of said seal groove;
   said fluid-bearing seal internal radial tubes coupled to said inlet grooves at one end and extending to the outer surface of said seal such that said inlet grooves and said radial tubes allow some leakage of the fluid flow past the outer surface of said fluid-bearing seal;
   a second seal between the truncated end of said outer ball member and the inner ball member, said second seal being spaced from the fluid-bearing seal to form a seepage space in which leakage fluid from the fluid-bearing seal accumulates; and
   a tube extending through the outer ball member into said seepage space for draining the accumulated leakage fluid therefrom.

7. A connector as in claim 6 further including a low-turbulence screen contained within said connector.

8. A connector for a fluid-flow line, designed to minimize the torque effects of fluid flow on the connector, comprising:
   an outer ball member comprising a truncated sphere with a tubular shape at the non-truncated end;
   an inner ball member shaped like said outer ball member and nesting within it, the truncated end of the outer ball member facing towards the downstream side of the flow and the truncated end of the inner ball member facing upstream;
   a seal groove having an upstream wall;
   a pair of functioning end members comprising circular discs in the form of a grid structure, each end member being attached to the tubular open end of a different ball member;
   a tension wire adjustably attached to and located between said end members;
   a fluid-bearing seal having an outer surface and formed with internal radial tubes located within said seal groove and between said ball members to seal, with a limited amount of leakage, the space between said members;
   a plurality of inlet grooves extending along said upstream wall of said seal groove;

said fluid-bearing seal internal radial tubes coupled to said inlet grooves at one end and extending to the outer surface of said seal, such that said inlet grooves and said radial tubes allow some leakage of the fluid flow past the outer surface of said fluid-bearing seal;

a second seal between the truncated end of said outer ball member and the inner ball member, said second seal being spaced from the fluid-bearing seal to form a seepage space in which leakage fluid from the fluid-bearing seal accumulates; and a tube extending through the outer ball member into said seepage space for draining the accumulated leakage fluid therefrom.

9. A connector as in claim 8 further including a low-turbulence screen contained within said connector.

* * * * *